United States Patent
Morrison et al.

(10) Patent No.: US 12,358,000 B2
(45) Date of Patent: Jul. 15, 2025

(54) METHODS OF TREATING METAL MINE TAILINGS

(71) Applicants: Douglas Morrison, Etobicoke (CA); Vernon Kent Drylie, Oakville (CA)

(72) Inventors: Douglas Morrison, Etobicoke (CA); Vernon Kent Drylie, Oakville (CA)

( * ) Notice: Subject to any disclaimer, the term of this patent is extended or adjusted under 35 U.S.C. 154(b) by 486 days.

(21) Appl. No.: 17/796,510

(22) PCT Filed: Jan. 28, 2021

(86) PCT No.: PCT/CA2021/050085
§ 371 (c)(1),
(2) Date: Jul. 29, 2022

(87) PCT Pub. No.: WO2021/151197
PCT Pub. Date: Aug. 5, 2021

(65) Prior Publication Data
US 2023/0055554 A1  Feb. 23, 2023

(30) Foreign Application Priority Data
Jan. 31, 2020 (CA) ............................... CA 3070620

(51) Int. Cl.
*B03B 9/02* (2006.01)
*B03B 5/48* (2006.01)

(52) U.S. Cl.
CPC . *B03B 9/02* (2013.01); *B03B 5/48* (2013.01)

(58) Field of Classification Search
CPC ....... B03B 9/02; B03B 5/48; C02F 2001/007; C02F 2103/10; C02F 2301/043; C02F 1/00
See application file for complete search history.

(56) References Cited

U.S. PATENT DOCUMENTS

2012/0248042 A1*  10/2012  Baldrey ................. B03D 1/02
                                                    210/710
2020/0283324 A1    9/2020  Filmer et al.

FOREIGN PATENT DOCUMENTS

CA    2075721 A1    11/1993
CA    2735640 A1    10/2012

OTHER PUBLICATIONS

International Search Report dated Apr. 30, 2021, which issued in the corresponding PCT Patent Application No. PCT/CA2021/050085.

* cited by examiner

*Primary Examiner* — Waqaas Ali
(74) *Attorney, Agent, or Firm* — Dickinson Wright PLLC

(57) ABSTRACT

Disclosed herein are methods of treating metal mine tailings. Embodiments of the method comprise separating the metal mine tailings into a highly contaminated fraction and a tolerable benign fraction, purifying the tolerable benign fraction and disposing the purified tolerable benign fraction within a managed environment, and sequestering the highly contaminated fraction in a sub-aqueous tailings management facility.

7 Claims, No Drawings

METHODS OF TREATING METAL MINE TAILINGS

FIELD OF INVENTION

The present invention relates to mine tailing treatment, more specifically to long-term treatment of metal mine tailings.

BACKGROUND OF THE INVENTION

Generally, tailings are the materials left over after the process of separating the valuable fraction from the uneconomic fraction of an ore. The extraction of minerals from ore may be done two ways: placer mining, which uses water and gravity to concentrate the valuable minerals, or hard rock mining, which pulverizes the rock containing the ore and then relies on chemical reactions to concentrate the sought-after material. In the latter, the extraction of minerals from ore requires comminution, i.e., grinding the ore into fine particles to facilitate extraction of the target elements. Because of this comminution, tailings consist of a slurry of fine particles, ranging from the size of a grain of sand to a few micrometres. Mine tailings are usually produced from the mill as a slurry, which is a mixture of fine mineral particles and water.

The remediation of mine tailings, including metal mine tailings, is a dire environmental issue. Metal mine tailings are often toxic to local flora and fauna and remediation may require prohibitive amounts of water. Sub-aqueous deposition of tailings has been the primary technique used for the deposition of large tonnages of finely ground metal mine tailings. This technique requires enormous amounts of water to generate a saturated mass designed to limit the release of contaminants into the environment. The water or fluid can be either acidic or alkaline, depending upon the mineral source. The approach has been refined over the last 40 years and is now routinely implemented in most mining jurisdictions, where deposition of over 100,000 tonnes per day are commonplace.

Sub-aqueous deposition typically requires the development of a tailings management facility (TMF) which occupies a very large area and is tens of metres deep. It is often designed with sufficient capacity to retain all the waste products of the entire mine life, or at least for several decades of production. In cases of acidic tailings, the approach may include the application of lime to capture the metal salts that are dissolved in the effluent flow from the facility, thus creating a sludge that has to be removed and disposed of in hazardous waste facilities. The approach requires local communities to have faith that mining companies will operate these facilities responsibly over several tens of decades, if not centuries, once mine production has ceased.

However, the number of catastrophic tailings dam failures around the to world has undermined the public's confidence in the mining industry's ability to safely manage these facilities. The severity of such failures is directly related to the large volumes of water or fluid behind the dam and how much is released into the environment after failure of the dam. These failures have increased the time required to obtain financing, permit approval and social acceptance to open and operate a new facility. In arid terrains, the competition for water resources is now so fierce that it is very difficult for industry to continue with water-intensive strategies. Recent dam failures have focused attention on up-stream versus down-stream construction of tailings dams and on various methods of de-watering. However, the more fundamental issue is the long-term probability of failure of each storage facility. For facilities that depend on continuing human intervention to maintain their physical stability many decades into the future, the probability of failure is very high.

The risk and consequent impact of a tailings dam failure may be reduced by limiting the volume of water stored behind the dam. Using densified tailings or paste tailings deposition significantly reduces the amount water stored in the facility, but the application of these alternatives is limited to a few cases with very specialized conditions. Dry-stacking, where the solid waste products can simply be deposited on a smaller footprint, has only been done for very specific tailings that are non-acid-generating. Large numbers of base-metal mine tailings depositions are highly acid-generating and contain high levels of contaminants, or have fine particulates suspended in highly caustic fluids. These methods are unfortunately limited to very specific conditions and may not be effective for most tailings.

A common approach applied to stable tailings depositions is to treat the leachate that is produced by the tailings in a water treatment plant, requiring the addition of chemicals and the removal of sludge by-products from the plant for many decades after the production of tailings had ceased. The solid tailings are managed by establishing a protective organic and vegetative cover over the tailings with various physical and chemical barriers to prevent up-ward transmission of contaminants to the surface vegetation. To date, few of the applications of vegetative covers have proven to be successful beyond a decade. The failures are often the result of damage to the organic cover through climatic events, such as excessive drought or excessive precipitation, which exposes contaminated tailings and kills the vegetative cover.

There is a need in the tailings deposition system art for remediation methodology that prevents contamination into the local environment and does not require long-term human intervention after the cessation of mining operations.

SUMMARY OF THE INVENTION

The present invention relates to methods of treating metal mine tailings comprising:
- separating the metal mine tailings into a contaminated fraction and a tolerable benign fraction;
- purifying the tolerable benign fraction and disposing the purified tolerable benign fraction within a managed environment; and
- sequestering the contaminated fraction in a sub-aqueous tailings management facility.

In one or more embodiments of the methods described herein, separating comprises one or more of solid-liquid separation or density sorting.

Embodiments of the methods described herein further comprise recovering solid material from the contaminated fraction.

In one or more embodiments of the methods described herein, passively treating comprises separating the tolerable benign fraction into one or more cells.

Embodiments of the methods described herein further comprise monitoring the contamination level of the tolerable benign fraction. In some embodiments, monitoring comprises remote monitoring.

In one or more embodiments of the methods described herein, purifying comprises continuous water purification.

This summary of the invention does not necessarily describe all features of the invention.

DETAILED DESCRIPTION

One or more illustrative embodiments are described by way of example. Described herein are methods relating to the remediation of mine tailings. It will be appreciated that embodiments and examples are provided for illustrative purposes intended for those skilled in the art, and are not meant to be limiting in any way. All references to embodiments, examples, aspects, and the like are intended to be illustrative and non-limiting.

Disclosed herein are methods for treating metal mine tailings. An embodiment of the method comprises separating the metal mine tailings into a contaminated fraction and a tolerable benign fraction, purifying the tolerable benign fraction and disposing the purified tolerable benign fraction within a managed environment, and sequestering the contaminated fraction in a sub-aqueous tailings management facility. In most cases, the tolerable benign fraction will contain water-soluble contaminants, which either through their composition or relative concentration have been deemed by environmental agencies to have no or limited environmental impact. Conversely, the contaminated fraction typically contains contaminants that are considered by environmental agencies to be hazardous to the environment either by way of their composition or relative concentration.

Methods described herein may comprise a suite of technologies applied progressively, in sequence, to achieve full closure of a metal mine waste-stream deposition, resulting in long-term stability of any facilities and reducing the ultimate probability of failure of the facility to zero or near-zero.

Embodiments of the methods disclosed herein may eliminate the exposure of the natural environment to dissolved metal mine contaminants that are injurious to local ecologies. In some cases, the methods described herein may occur over a finite period of around of one decade after the cessation of mineral processing. This may allow for the production of industrial metals with a decreased impact on the natural environment or creating long-term liabilities from mining corporations.

Embodiments of the methods herein comprise separation of metal mine tailings into at least two fractions, a contaminated fraction (CF) and a tolerable benign fraction (TBF). The CF may be a small but highly contaminated portion of the total tailing comprising water-insoluble material. The TBF may be a much larger portion that is less contaminated than the CF and comprises water-soluble material. Examples of water-insoluble material may be fine particles or solid metals generated during the mining process and other contaminants. Examples of water-soluble materials may include metal salts and other chemicals/contaminants. Separation may be achieved using methods known in the art, such as solid-liquid separation, density sorting and others. Separation into the CF and TBF may be known as the separation and sequestration technology (SST) technique.

The smaller CF is sequestered in a sub-aqueous tailings management facility (TMF). In some cases, the CF is sequestered temporarily. In such cases, this material may be treated over time by a series of industrial processes known in the art. These processes may enable the recovery of valuable material, recover or create industrial compounds for future use, or ensure the remaining material is physically or chemically encapsulated so as to be inert and suitable for stable, long-term storage.

The CF may be further treated to decontaminate the fraction and/or recover valuable material. Treatment of the CF may result in a stable product for long-term storage. The larger volume of TBF may be disposed by continuous treatment systems known in the art followed by almost dry (non-saturated) deposition within a naturally vegetated, quasi-natural managed environment. The sequestered TBF may then be permanently remediated with the result that no conventional TBF will be left on site.

The tolerable benign fraction can be purified. Continuous water purification may be used, such as those found in the art. The TBF storage facility may be designed to have water flow through it, gradually leaching the remaining low level of contaminants from the solids. The water being disposed to the managed environment may be treated/purified first to ensure the levels of contamination are low enough to ensure the final leachate will be tolerable to the natural ecosystem.

The purified tolerable benign fraction is disposed within a managed environment. After the water purification step, the TBF may be disposed in a locally self-sustaining, physical and biotic water treatment system that protects the surrounding ecosystem from the leachate, converting the TBF into remediated, benign material. The managed environment may be an engineered bioreactor. The TBF may be disposed within discrete cells. The cells may be designed with the natural ecosystem and possible contaminant species and concentration in mind. The tolerance of the natural ecosystem to absorb contaminants may define the level of contaminants in the water retained in the TBF storage facility, plus the contaminants leached from the TBF material.

Embodiments of the current invention may allow the TBF material stored in individual cells to receive only natural precipitation over a period of 20 years or more, allowing the natural leaching process to create a solid material that is effectively completely benign and is suitable for alternative land use. Once mineral processing operations cease, the only precipitation delivered to the cells may be natural precipitation. Water quality monitoring of leachate from each cell may occur for several years to ensure contamination levels are safe for the local ecosystem. Engineered bioreactor technology known in the art may be used, such as those applied to several types of industrial waste. Applying this technique to the TBF material and effluent, albeit on a much larger scale, may accelerate the purification of the effluent from the individual cells to produce a benign tail over a much shorter period, such as 5-10 years. On-going research in the field of microbial remediation, including genetic manipulation of microbial biology, may accelerate this process further, but it is unlikely that bio-remediation techniques will become a stand-alone process solution without the initial application of physical and chemical treatment processes that comprise the separation and sequestration process.

Embodiments of the methods described herein may result in an engineered, but quasi-natural deposition, that is a naturally self-sustaining ecosystem set in a given terrain and climate. Every combination of different mining waste-streams and local ecosystem is unique, and the climate and terrain together define the constraints on the waste-stream management processes that have to be employed. The capacity of the final biotic ecosystem to cope with various contaminants will define the performance requirements of the various technologies that are employed up-stream as part of the progressive remediation process.

For example, a temperate zone may be outfitted with an engineered wetland that may be fed by low-contaminant level leachate, including dissolved metals, within the tolerance of the natural biotic systems in the wetland. Thus, the quasi-natural system may mitigate the remaining low-level contaminants over a period of time, for example 10-20 years. This may be achieved by ensuring that the level of contaminants in the solids and that of water that delivers the solids to the storage facility has been treated to remove dissolved metals to tolerable levels for the surrounding ecology that will receive them. This may be levels of as little as 30 ppb unless the limiting capacity of the quasi-natural system to process them is particularly low. Such a case might form the definition of an ecosystem in which genuinely self-sustaining tailings deposition is not realistically achievable, with the further implication that a local tailings facility cannot be contemplated in such an environment.

The monitoring and treatment systems may require on-going operational intervention, as well as on-going routine manual monitoring, for as long as new material is being produced and delivered to the tailings management facility. Remote, continuous monitoring of the final released contaminant levels may be done autonomously and can be reported by data transmission. Regulatory authorities may conduct on-going, routine physical testing as a control on the autonomous systems, confirming their accuracy by laboratory testing results, but once the leachate from an individual cell falls below regulatory levels, the cell can be defined as containing benign material suitable for alternative land use.

Embodiments described herein may increase the operating cost for tailings management, but may also reduce the capital cost of new tailings facilities, the high-cost containment facility for CF only will be much smaller than a conventional facility used for the entire volume of tailings, and the cost of storage of the larger volume of TBF material will be much lower than the prior art approaches. Some embodiments may allow for progressive closure of relatively small cells of TBF material, complete with durable revegetation, for example within 5-10 years. This may shorten the time taken to obtain social license to operate because it allays local concerns over the long-term stability and maintenance of large conventional TMFs.

Full and final closure plans have been successfully demonstrated on several small mineral extraction sites, many of them in Ontario, Canada. By completing the construction of small cells of residual tailings, it may be possible to demonstrate to local communities exactly how the tailings deposition will behave in the long term. By allaying local concerns over the long-term stability and maintenance of the mine waste management facility, communities are more likely to agree to have mine production begin after a consultation process of shorter duration than is common today. On balance, the increase in cost for separation, sequestration and treatment of mine wastes may be offset by the lower cost of containment and the financial impact of a simpler, more transparent and shorter permitting and approval process.

Some of the potential benefits of embodiments of the methods described herein are: the reduction of the long-term probability of failure of metal mine tailings deposition facilities from very high to very close to zero, the reduction in the capital cost of metal mine waste facilities that off-sets the increased operating cost of separation, sequestration and treatment of metal mine tailings, the availability of large volumes of uncontaminated fresh water that would normally be stored in conventional tailings management facilities, and the creation of large volumes of finely crushed and ground material that is environmentally benign and suitable for alternative land use in the local area.

The processes and methods described herein may be applied to an existing (or legacy) mine. The application of the methods described herein to the management of mine tailings and waste-water may be applied to mines that will begin production in the near future. Many of these existing facilities contain many hundreds of millions of tonnes of solids and billions of litres of contaminated fresh water that will remain a legacy for decades or centuries into the future. Such facilities have a high probability of failure in the long term and ultimately these issues have to be addressed.

The highest concentration of very large sub-aqueous TMFs are in the cordillera of South America, principally in Peru and Chile. In mountainous or high-relief terrain, the lack of flat land and the high rate of water run-off limits agricultural production and infrastructure construction. The deposition of large tonnages of benign mine tailings could be used to help resolve some of these issues.

In Peru, for example, pipelines to convey ocean water to the mine tailings sites above 4,000 m altitude have been built. This involves enormous pumping cost but also creates the potential for the salinification of the surrounding land through evaporation of the salt water in the arid conditions at altitude. The progressive approach to mine tailings described herein would make it possible to use pipelines to bring the tolerable benign fraction down to lower altitudes for disposition as usable land for agriculture or for coastal deposition and other developments. The electrical energy generated by the mass of tailings flowing down 4,000 m may exceed the electricity cost to pump sea-water to altitude. This leaves the scarce fresh-water resources at altitude to be used locally.

Examples of possible benefits of reactively implementing this progressive approach to near-future metal mine tailings facilities are: the transformation of the long-term probability of failure of conventional metal mine tailings management facilities from very high to close to zero, the recovery of large volumes of treated and uncontaminated fresh water from conventional metal mine tailings management facilities, the reduction in the cost of pumping water from coastal areas to high altitude by delivering benign tailings material through pipelines to lower altitudes, the elimination of the need for delivering large volumes of salt water to high altitudes where evaporation causes salinification, by re-using existing fresh water resources, and, the creation of large volumes of finely crushed and ground environmentally benign material for use in agriculture, industry or for infrastructure construction.

The present invention has been described with regard to one or more embodiments. However, it will be apparent to persons skilled in the art that a number of variations and modifications can be made without departing from the scope of the invention as defined in the claims.

What is claimed is:

1. A method of treating metal mine tailings comprising:
separating the metal mine tailings into a contaminated fraction and a tolerable benign fraction which is less contaminated than the contaminated fraction and comprises water-soluble materials;
purifying the tolerable benign fraction and disposing the purified tolerable benign fraction within a managed environment; and
sequestering the contaminated fraction in a sub-aqueous tailings management facility.

2. The method of claim 1, wherein separating comprises one or more of solid-liquid separation or density sorting.

3. The method of claim 1, further comprising recovering solid material from the contaminated fraction.

4. The method of claim 1, wherein passively treating comprises separating the tolerable benign fraction into one or more cells.

5. The method of claim 1, further comprising monitoring a contamination level of the tolerable benign fraction.

6. The method of claim 5, wherein monitoring comprises remote monitoring.

7. The method of claim 1, wherein purifying comprises continuous water purification.

* * * * *